United States Patent
Takaoka et al.

(10) Patent No.: US 9,362,722 B2
(45) Date of Patent: Jun. 7, 2016

(54) SPARK PLUG WITH IMPROVED WITHSTAND VOLTAGE CHARACTERISTICS AND HIGH MECHANICAL STRENGTH AT HIGH TEMPERATURES

(71) Applicant: NGK Spark Plug Co., LTD., Nagoya-shi, Aichi (JP)

(72) Inventors: Katsuya Takaoka, Ichinomiya (JP); Hirokazu Kurono, Nagoya (JP); Toshitaka Honda, Nagoya (JP); Syuuichiro Wakizoe, Kounan (JP); Mitsushiro Kondo, Kounan (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 140 days.

(21) Appl. No.: 14/377,306

(22) PCT Filed: Nov. 29, 2012

(86) PCT No.: PCT/JP2012/007652
§ 371 (c)(1),
(2) Date: Aug. 7, 2014

(87) PCT Pub. No.: WO2013/128525
PCT Pub. Date: Jun. 9, 2013

(65) Prior Publication Data
US 2015/0047880 A1 Feb. 19, 2015

(30) Foreign Application Priority Data
Feb. 27, 2012 (JP) ................. 2012-039584

(51) Int. Cl.
*H01T 13/20* (2006.01)
*H01T 13/38* (2006.01)
(Continued)

(52) U.S. Cl.
CPC ................. *H01T 13/38* (2013.01); *B82Y 30/00* (2013.01); *C04B 35/117* (2013.01);
(Continued)

(58) Field of Classification Search
CPC ......... H01T 13/38; F02P 13/00; B82Y 30/00; C04B 35/62655; C04B 35/117; C04B 35/62695
USPC .......................................... 313/118, 140–143
See application file for complete search history.

(56) References Cited

U.S. PATENT DOCUMENTS

| 8,278,809 B2 | 10/2012 | Kurono et al. | 313/141 |
| 8,390,183 B2 | 3/2013 | Kurono et al. | 313/118 |

(Continued)

FOREIGN PATENT DOCUMENTS

| JP | 2001-335360 | 12/2001 | C04B 35/111 |
| JP | 2008-024583 | 2/2008 | C04B 35/111 |

(Continued)

OTHER PUBLICATIONS

International Search Report for International Application No. PCT/JP2012/007652, Feb. 12, 2013.

*Primary Examiner* — Joseph L Williams
(74) *Attorney, Agent, or Firm* — Kusner & Jaffe

(57) ABSTRACT

A spark plug exhibiting excellent withstand voltage characteristics and mechanical strength at high temperature, which are comparable to those at ambient temperature. The spark plug having an insulator formed of an alumina-based sintered material containing: an Al component, an Si component, a Group 2 element component, and a rare earth element component. The amounts of such components satisfy a condition (1): $0.25 \leq$ oxide-reduced amount (mass %) of the Si component $\leq 1.25$, and a condition (2): $1.35 \leq$ [(oxide-reduced amount of the Si component)/((oxide-reduced amount of the Group 2 element component)/(oxide-reduced amount of the rare earth element component))] $\leq 7.5$. The alumina-based sintered material includes alumina grains, and a glass phase including a crystal phase that satisfies a condition (3) that the crystal phase includes at least one of an aluminate crystal phase and a silicate crystal phase, each having a grain size of 20 to 350 nm.

7 Claims, 2 Drawing Sheets

(51) Int. Cl.
*C04B 35/117* (2006.01)
*C04B 35/626* (2006.01)
*B82Y 30/00* (2011.01)
*F02P 13/00* (2006.01)

(52) U.S. Cl.
CPC .... *C04B 35/62655* (2013.01); *C04B 35/62695* (2013.01); *F02P 13/00* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3418* (2013.01); *C04B 2235/781* (2013.01); *C04B 2235/785* (2013.01); *C04B 2235/786* (2013.01); *C04B 2235/788* (2013.01); *C04B 2235/80* (2013.01)

(56) References Cited

U.S. PATENT DOCUMENTS

| | | | |
|---|---|---|---|
| 8,431,505 B2 | 4/2013 | Ogata et al. | 501/128 |
| 8,482,187 B2 | 7/2013 | Takaoka et al. | 313/118 |
| 8,564,183 B2 | 10/2013 | Suzuki et al. | 313/118 |
| 8,564,184 B2 | 10/2013 | Kurono et al. | 313/143 |
| 2007/0298245 A1 | 12/2007 | Ogata et al. | 428/329 |
| 2008/0309388 A1 | 12/2008 | Hashimoto et al. | 327/161 |
| 2010/0136867 A1 | 6/2010 | Kurono et al. | 445/7 |
| 2010/0229813 A1 | 9/2010 | Ogata et al. | 123/146.5 |
| 2011/0077141 A1 | 3/2011 | Walker et al. | 501/32 |
| 2012/0007489 A1 | 1/2012 | Kurono et al. | 313/141 |
| 2012/0080996 A1 | 4/2012 | Takaoka et al. | 313/141 |
| 2012/0176022 A1 | 7/2012 | Nakagawa et al. | 313/141 |
| 2012/0187819 A1 | 7/2012 | Takaoka et al. | 313/118 |
| 2012/0262049 A1 | 10/2012 | Kurono et al. | 313/141 |
| 2012/0319556 A1 | 12/2012 | Suzuki et al. | 313/141 |

FOREIGN PATENT DOCUMENTS

| | | | |
|---|---|---|---|
| JP | 2010-208901 | 9/2010 | C04B 35/111 |
| JP | 4607253 | 10/2010 | H01T 13/38 |
| JP | 4613242 | 10/2010 | H01T 13/38 |
| JP | 2010-251281 | 11/2010 | H01T 13/38 |
| JP | 4651732 | 12/2010 | H01T 13/38 |
| JP | 4756087 | 6/2011 | H01T 13/34 |
| WO | WO 2011/001656 | 1/2011 | H01T 13/38 |
| WO | WO 2011/001699 | 1/2011 | H01T 13/38 |
| WO | WO 2011/036853 | 3/2011 | H01T 13/38 | ically, to a spark plug which exhibits, even at high
SPARK PLUG WITH IMPROVED WITHSTAND VOLTAGE CHARACTERISTICS AND HIGH MECHANICAL STRENGTH AT HIGH TEMPERATURES

FIELD OF THE INVENTION

The present invention relates to a spark plug, and more particularly, to a spark plug which exhibits, even at high temperature, excellent withstand voltage characteristics and high excellent mechanical strength, which are comparable to those at ambient temperature.

BACKGROUND OF THE INVENTION

Alumina-based sintered material, containing alumina as a predominant component, has excellent withstand voltage characteristic, heat resistance, mechanical strength, or the like, and is an inexpensive material. Therefore, the sintered material is employed for producing ceramic products, such as a spark plug ceramic insulator (may be referred to simply as "insulator" in the specification) and a multi-layer wiring board of IC packages. Such alumina-based sintered material has been produced by sintering a powder mixture containing a sintering aid including $SiO_2$. One example thereof is an "insulating material" disclosed in U.S. Patent Application No. 2011-0077141 ("Patent Document 1").

However, when a spark plug insulator is produced from an alumina-based sintered material produced through sintering a raw material with a sintering aid, after sintering, the sintering aid (mainly an Si component) remains at the grain boundary among alumina crystal grains as a low-melting-point glass phase. In this case, the low-melting-point glass phase is softened in a spark plug use environment, such as in a high temperature environment of about 700° C., impairing the withstand voltage characteristics of the insulator. The amount of low-melting-point glass phase in an alumina-based sintered material could be reduced by reducing the amount of the sintering aid added to the raw material. However, in this case, the insulator cannot be densified, or, even when the insulator has been apparently densified, a large number of pores remain in the grain boundary defined by alumina crystal grains, also impairing the withstand voltage characteristics of the insulator.

Meanwhile, internal combustion engines to which a spark plug is to be attached are designed for a small-scale and/or a high-output mode, and increase in area of an intake or an exhaust valve in a combustion chamber, employment of a 4-valve configuration, high compression ratio, etc. have been proposed. Thus, the spark plug which is to be attached to such an internal combustion engine designed for a small-scale and/or a high-output mode must maintain excellent withstand voltage characteristics and have an insulator which is prevented from breakdown and which has high mechanical strength under high-temperature conditions, even though the spark plug is thinned and downsized.

There have already been proposed spark plugs or insulators which meet the above demand. For example, such "spark plugs" and "insulators" are disclosed in Japanese Patent No. 4607253, Japanese Patent No. 4613242, International Publication WO 2011/001699, International Publication WO 2011/001656, International Publication WO 2011/036853, Japanese Patent Application Laid-Open (kokai) No. 2008-24583, and Japanese Patent Application Laid-Open (kokai) No. 2010-208901 ("Patent Documents 2 to 8").

In recent years, small-scale and/or high-output mode internal combustion engines have been realized more and more. Thus, a spark plug which can exhibit more excellent withstand voltage characteristics and high mechanical strength can satisfactorily realize internal combustion engines of an advanced type such as a small-scale engine. In a small-scale and/or high-output mode internal combustion engine, when the tip of a spark plug exposed to a combustion chamber comes into contact with an easily volatile component vaporized through combustion in the combustion chamber, the surface area of the tip is rapidly cooled. Since alumina crystals and the grain boundary phase defining the grain boundary thereof (e.g., a crystal phase) have different thermal expansion coefficients, the crystal phase in the grain boundary phase serves as a breakage-causing point, thereby causing breakage of the tip of the insulator. In this case, the withstand voltage characteristics and mechanical strength of the spark plug may be impaired at high temperature. Thus, a spark plug, in particular, a spark plug to be attached to a small-scale and/or a high-output mode internal combustion engine, is desired to have further improved withstand voltage characteristics and mechanical strength.

An object of the present invention is to provide a spark plug which exhibits, even at high temperature, excellent withstand voltage characteristics and high excellent mechanical strength, which are comparable to those at ambient temperature.

SUMMARY OF THE INVENTION

A characteristic feature of the spark plug of the present invention for solving the aforementioned problems resides in that the spark plug comprises an insulator formed of an alumina-based sintered material, wherein the insulator contains an Al component, an Si component, a Group 2 element component, the Group included in the periodic TABLE defined by Recommendations 1990, IUPAC, and a rare earth element component in such amounts that satisfy a condition (1): $0.25 \leq$ oxide-reduced amount (mass %) of the Si component $\leq 1.25$, and a condition (2): $1.35 \leq [(\text{oxide-reduced amount of the Si component})/((\text{oxide-reduced amount of the Group 2 element component})/(\text{oxide-reduced amount of the rare earth element component}))] \leq 7.5$; and the insulator includes alumina grains, and a glass phase including a crystal phase that satisfies a condition (3) that the crystal phase includes at least one of an aluminate crystal phase and a silicate crystal phase, each having a grain size of 20 to 350 nm.

EFFECTS OF THE INVENTION

In use, the spark plug of the present invention is attached to a conventional internal combustion engine or to a small-scale and/or a high-output mode internal combustion engine. Thus, the spark plug is required to maintain high performances through suppression of a drop in performance at high temperature. Since the spark plug of the present invention satisfies all the conditions (1) to (3), the spark plug exhibits excellent withstand voltage characteristics and high mechanical strength not only at ambient temperature but also at high temperature. Also, the spark plug of the present invention, satisfying all the conditions (1) to (3), exhibits, even at high temperature, excellent withstand voltage characteristics and high excellent mechanical strength, which are comparable to those at ambient temperature. Thus, the present invention enables provision of a spark plug which exhibits, even at high temperature, excellent withstand voltage characteristics and high excellent mechanical strength, which are comparable to those at ambient temperature.

BRIEF DESCRIPTION OF THE DRAWINGS

FIGS. 1(a) and 1(b) are explanatory views showing a spark plug which is one example of the spark plug according to the present invention, wherein FIG. 1(a) is a partially-sectioned overall view of the spark plug which is one example of the spark plug according to the present invention, and FIG. 1(b) is a sectional view showing a main portion of the spark plug which is one example of the spark plug according to the present invention.

DETAILED DESCRIPTION OF THE INVENTION

The spark plug according to the present invention essentially has an insulator satisfying the aforementioned conditions. For example, the spark plug includes a center electrode, a generally cylindrical insulator surrounding the center electrode and satisfying the aforementioned conditions, and a ground electrode disposed such that one end of the ground electrode faces the center electrode via a spark discharge gap. So long as the spark plug has an insulator satisfying the aforementioned conditions, no particular limitation is imposed on the remaining structure of the spark plug of the invention, and any of various known structures may be employed.

Figure 1A:
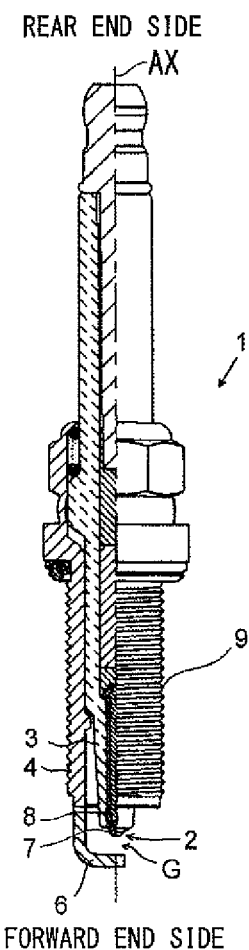
Figure 1B:
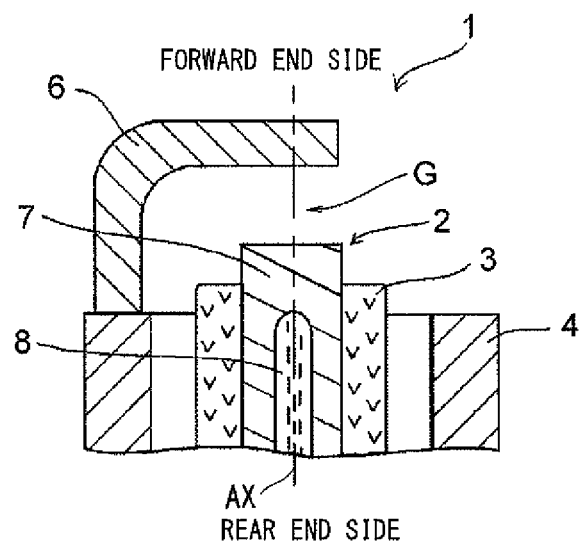

Hereinafter, with reference to FIG. 1, the spark plug according to the present invention, and the insulator, which is an essential member of the spark plug, will be described. FIG. 1(a) is a partially-sectioned overall view of the spark plug 1 which is one example of the spark plug according to the present invention, and FIG. 1(b) is a sectional view showing a main portion of the spark plug 1 which is one example of the spark plug according to the present invention. In the following description, the lower side of FIG. 1(a) will be referred to as the forward end side with respect to the direction of an axis AX, and the upper side of FIG. 1(a) will be referred to as the rear end side with respect to the direction of the axis AX. Also, the upper side of FIG. 1(b) will be referred to as the forward end side with respect to the direction of the axis AX, and the lower side of FIG. 1(b) will be referred to as the rear end side with respect to the direction of the axis AX.

As shown in FIGS. 1(a) and 1(b), the spark plug 1 includes a generally rod-shaped center electrode 2; a generally cylindrical insulator 3 surrounding the center electrode 2; a cylindrical metallic shell 4 holding the insulator 3; and a ground electrode 6. One end of the ground electrode 6 is disposed to face the forward end surface of the center electrode 2 via a spark discharge gap G, and the other end of the ground electrode 6 is joined to the metallic shell 4.

The metallic shell 4 has a cylindrical shape, and holds the insulator 3 inserted thereinto. A screw portion 9 is formed on the outer circumferential surface of a forward end portion of the metallic shell 4. The spark plug 1 is attached to the cylinder head of an unillustrated internal combustion engine by making use of the screw portion 9. The metallic shell 4 may be formed of an electrically conductive steel material, such as low carbon steel. Examples of the standard of the screw portion 9 include M10, M12, and M14. In the present invention, the nominal diameter of screw portion 9 refers to a value defined in ISO2705 (M12), ISO2704 (M10), and the like. Needless to say, variance in nominal diameter may be acceptable, so long as the variance falls within size tolerances stipulated in such standards. In the case where the spark plug 1 is attached to a recent internal combustion engine of a small-scale and/or a high-output mode, the nominal diameter of the screw portion 9 is generally M10 or less. Generally, when the nominal diameter of the screw portion 9 is smaller, the thickness of the insulator 3 cannot be ensured. In this case, withstand voltage characteristics and mechanical strength readily and considerably drop. In contrast, according to the present invention, the insulator 3 satisfies the below-described conditions (1) to (3), excellent withstand voltage characteristics and mechanical strength can be attained.

The center electrode 2 assumes a generally rod-like body extending in the axis direction and is composed of an outer member 7 and an inner member 8 formed such that the inner material 8 is concentrically embedded at the center of the outer member 7. The center electrode 2 is fixed to the insulator 3 such that its forward end portion projects from the forward end surface of the insulator 3, whereby the center electrode 2 is held by the metallic shell 4 and is insulated therefrom. The outer member 7 of the center electrode 2 may be formed of a Ni-based alloy, which is excellent in heat resistance and corrosion resistance. The inner member 8 of the center electrode 2 may be formed of a metallic material which is excellent in heat conductivity such as copper (Cu) or nickel (Ni).

The ground electrode 6 has, for example, a prismatic shape. One end of the ground electrode 6 is joined to the end surface of the metallic shell 4, and is bent into a generally L-like shape. The shape and configuration of the ground electrode 6 are designed such that a distal end portion of the ground electrode 6 is aligned with the axis AX of the center electrode 2. Since the ground electrode 6 is designed in this manner, the other end of the ground electrode 6 faces the center electrode 2 via the spark discharge gap G. The spark discharge gap G is a gap between the forward end surface of the center electrode 2 and the surface of the ground electrode 6, and is generally set to 0.3 to 1.5 mm. Since the ground electrode 6 is exposed to a higher temperature, as compared with the center electrode 2, preferably, the ground electrode 6 is formed of an Ni-based alloy or the like which is better than the Ni-based alloy of the center electrode 2 in terms of heat resistance corrosion resistance, etc.

The insulator 3 is formed of the below-described alumina-based sintered material into a generally cylindrical shape, and has an axial hole for holding the center electrode 2 along the axis AX of the insulator 3. The insulator 3 is held or fixed by an inner circumferential portion of the metallic shell 4 by the mediation of talc and/or packing or the like (not shown), such that a forward end portion of the insulator 3 projects from the forward end surface 4a of the metallic shell 4. In the case where the nominal diameter of the screw portion 9 of the metallic shell 4 is adjusted to M10 or less, the insulator 3 must have a small wall thickness of 0.7 to 1.0 mm, as measured at the forward end surface of the metallic shell 4. In the present invention, since the alumina-based sintered material forming the insulator 3 satisfies the below-described conditions, the wall thickness can be adjusted to the above target level, without considerably impairing the characteristics thereof.

Next, the alumina-based sintered material, which forms the insulator 3 of the spark plug 1 and which is a characteristic feature of the invention, will be described in detail. The alumina-based sintered material contains an Al component, an Si component, a Group 2 element component, the Group included in the periodic table defined by Recommendations 1990, IUPAC, and a rare earth element component.

The alumina-based sintered material contains alumina ($Al_2O_3$) as a predominant component. As used herein, the term "predominant component" refers to a component of the highest content. When a sintered material contains an Al component as a predominant component, the sintered material is excellent in withstand voltage characteristic, heat resistance, mechanical strength, and the like.

The Si component originates from the sintering aid employed in sintering and is present in the form of oxide, ion, etc. in the alumina-based sintered material. The Si component melts during sintering, to generally form a liquid phase. That is, the Si component serves as a sintering aid promoting the densification of the formed sintered material. After completion of sintering, the Si component generally forms a low-melting-point glass or the like at the grain boundary phase formed of alumina crystal grains. However, when the alumina-based sintered material containing the Si component further contains the below-mentioned specific components at specific proportions, the Si component tends to preferentially form a high-melting point glass or the like, rather than low-melting-point glass.

The Group 2 element component originates from the sintering aid employed in sintering and may include at least one element of the Group 2 elements in the periodic table defined by Recommendations 1990, IUPAC. From the viewpoint of low toxicity, Mg, Ca, Sr, and Ba are preferred. The Mg component originates from the sintering aid employed in sintering and is present in the form of oxide, ion, etc. in the alumina-based sintered material. Similar to the Si component before sintering, the Mg component serves as a sintering aid, and forms a crystal phase mentioned hereinbelow with the Si component or the Al component in the glass phase, to thereby improve the withstand voltage characteristics and mechanical strength of the insulator 3 produced from the alumina-based sintered material. The Ba component, the Ca component, and the Sr component originate the sintering aid employed in sintering and are present in the form of oxide, ion, etc. in the alumina-based sintered material. Similar to the Mg component before sintering, these components serve as sintering aids, and form a crystal phase mentioned hereinbelow with the Si component or the Al component in the glass phase, to thereby improve the withstand voltage characteristics and mechanical strength of the insulator 3 produced from the alumina-based sintered material.

The alumina-based sintered material contains a rare earth element component originating from the sintering aid employed in sintering, and includes Sc, Y, and lanthanoid elements. Specifically, the rare earth element component includes an Sc component, a Y component, a La component, a Ce component, a Pr component, an Nd component, a Pm component, an Sm component, an Eu component, a Gd component, a Tb component, a Dy component, an Ho component, an Er component, a Tm component, a Yb component, and an Lu component. The rare earth element component is present in the form of oxide, ion, etc. in the alumina-based sintered material. The rare earth element component, employed in sintering, suppresses excessive grain growth of alumina during sintering and forms a crystal phase mentioned hereinbelow with the Al component or the Si component, to thereby improve the withstand voltage characteristics and mechanical strength of the insulator 3 produced from the alumina-based sintered material. The rare earth element component may be any of the aforementioned components, but is preferably at least one component selected from the group consisting of a Y component, an La component, a Pr component, an Nd component, and a Yb component. These components form a crystal phase mentioned hereinbelow with the Si component or the Al component in the glass phase, to thereby improve the withstand voltage characteristics and mechanical strength of the insulator 3 produced from the alumina-based sintered material.

The alumina-based sintered material contains an Al component, an Si component, a Group 2 element component, and a rare earth element component so as to satisfy the following conditions (1) and (2), with the total mass of the components forming the alumina-based sintered material, as educed to the oxides thereof, being 100 mass %. The conditions are as follows: condition (1): $0.25 \leq$ oxide-reduced amount (mass %) of the Si component $\leq 1.25$, and condition (2): $1.35 \leq$ [(oxide-reduced amount of the Si component)/((oxide-reduced amount of the Group 2 element component)/(oxide-reduced amount of the rare earth element component))]$\leq 7.5$.

The condition (1) relates to Si component content. Specifically, the Si component content is 0.25 mass % to 1.25 mass %. When the Si component content satisfies the condition (1), grain boundary phase, which generally impairs withstand voltage characteristics, can be reduced without lowering productivity. Furthermore, in some cases, nanometer-size crystals may be deposited or generated in the glass phase with a Group 2 element component and/or a rare earth element component present at a high content and satisfying the condition (2). Thus, when the Si component content is in excess of 1.25 mass %, large-grain-size crystals, which may serve as breakage-causing points, are readily formed, and withstand voltage characteristics and mechanical strength may be considerably impaired at high temperature as compared with ambient temperature. When the Si component content is less than 0.25 mass %, alumina cannot be completely sintered, and the sintered product has many pores. In order to densify the sintered product, high-temperature sintering must be performed, elevating production cost. In addition, high-temperature sintering promotes growth of alumina grains, possibly lowering mechanical strength. In order to readily deposit or generate nanometer-size crystals so as to attain improved withstand voltage characteristics and mechanical strength at high temperature, which are comparable to those at ambient temperature, the Si component content is preferably 0.40 mass % to 1.18 mass %. The Si component content preferably satisfies the condition (2) among the aforementioned conditions. In other words, the Si component content is determined so as to fall within the range of the condition (2). As used herein, the Si component content refers to the amount of Si component oxide ($SiO_2$).

The condition (2) relates to the relationship involving the Si component, the Group 2 element component, and the rare earth element component. Specifically, the ratio of the Si component content to the ratio of the Group 2 element component content to the rare earth element component content is 1.35 to 7.5. When the [(the Si component content)/((the Group 2 element content)/(the rare earth element component content))] (the ratio may be referred to as a "Si component ratio") is less than 1.35, excessively grown crystal phase portions are generated in the glass phase, which may impair withstand voltage characteristics and mechanical strength at high temperature. In addition, when the Si component ratio is less than 1.35, sinterability lowers, and the sintered product has many pores. In order to densify the sintered product, high-temperature sintering must be performed, elevating production cost. In addition, high-temperature sintering promotes growth of alumina grains, possibly lowering mechanical strength. When the Si component ratio is in excess of 7.5, no crystal phase is provided in the glass phase, possibly impairing withstand voltage characteristics and mechanical strength at high temperature. Thus, when the Si component ratio falls within the aforementioned range, the grain boundary phase, which impairs withstand voltage characteristics, can be reduced, but the crystal phase portions can be increased. In this case, nanometer-size crystal phase portions tend to be provided in the glass phase, to thereby enhance withstand voltage characteristics and mechanical strength at high temperature, while productivity is maintained. From the viewpoints of suppression of a drop in withstand voltage characteristic and mechanical strength at high temperature and realization of the two characteristics at higher levels, the Si component ratio is preferably 1.35 to 7.50, particularly preferably 1.7 to 6.5.

No particular limitation is imposed on the Al component content, so long as it is the highest among the component contents of the alumina-based sintered material. The Al component content of the alumina-based sintered material is preferably 97.0 mass % or more, with respect to the total mass of the oxide-reduced components of the alumina-based sintered material as 100 mass %. When the Al component content is 97.0 mass % or more, the insulator 3 has high thermal conductivity. In this case, the insulator 3 is not readily broken by quenching, a drop in withstand voltage characteristic and a drop in mechanical strength at high temperature is suppressed, and the two characteristics can be attained at higher levels. For example, in the case where the Al component content is 97.0 mass % or more, the insulator 3 is not broken, when it is quenched from a temperature as high as 800° C. at a cooling rate of 200° C./sec or more. From the viewpoint of further suppressing a drop in withstand voltage characteristic and mechanical strength at high temperature, the Al component content is particularly preferably 97.3 mass % or more. The upper limit of the Al component content may be less than 100 mass % and is preferably 98.5 mass/%, for the purpose of suppressing a drop in sinterability and an increase in production cost. As used herein, the Al component content refers to the amount of Al component oxide (i.e., alumina, $Al_2O_3$).

The Si component content is as described above.

No particular limitation is imposed on the Group 2 element component content, so long as the Group 2 element component content together with the Si component content and the rare earth element component content satisfies the condition (2). From the viewpoints of withstand voltage characteristic and mechanical strength, the Group 2 element component content is preferably, for example, 0.10 mass % or more, particularly preferably 0.18 mass % to 0.56 mass %. As used herein, the Group 2 element component content refers to the amount by mass % of a Group 2 element component oxide (MgO, BaO, CaO, or SrO). When a plurality of Group 2 elements are used, the Group 2 element component content is the total amount thereof.

No particular limitation is imposed on the rare earth element component content, so long as the rare earth element component content together with the Si component content and the Group 2 element component content satisfies the condition (2). From the viewpoint of readily forming nanometer-size crystals of the rare earth element component with the Al component or the Si component, the rare earth element component content is preferably higher than that of the alumina-based sintered material employed in a conventional spark plug. For example, the rare earth element component content is 0.31 mass % to 2.59 mass %, particularly preferably 0.85 mass % to 1.56 mass %. As used herein, the rare earth element component content refers to the amount by mass % of a rare earth element component oxide ($RE_2O_3$, RE: rare earth element). When a plurality of rare earth elements are used, the rare earth element component content is the total amount thereof.

In the present invention, the Al component content, the Si component content, the Group 2 element component content, and the rare earth element component content of the alumina-based sintered material may be determined as an oxide-reduced mass or an oxide-reduced mass % by means of, for example, an electron probe microanalyzer (EPMA). Notably, the component contents of the alumina-based sintered material of the present invention determined by means of an electron probe microanalyzer substantially coincide with the relative amounts of the components for producing the alumina-based sintered material. Therefore, each component content and the Si component ratio can be regulated by modifying the relative amounts of the component raw material powders.

The alumina-based sintered material contains an Al component, an Si component, a Group 2 element component, and a rare earth element component in amounts satisfying the conditions (1) and (2). The alumina-based sintered material is substantially formed of the Al component, Si component, Group 2 element component, and rare earth element component. As used herein, the term "substantially formed of" refers to no component other than the above components being intentionally incorporated into the sintered material through addition or a similar technique. However, in some cases, each component of the alumina-based sintered material contains unavoidable impurities and the like in small amounts. Thus, the alumina-based sintered material may contain unavoidable impurities in addition to the above components, so long as the object of the present invention is not impaired. Examples of the unavoidable impurities which may be included in the alumina-based sintered material include Na, S, and N. The total amount of the unavoidable impurities is preferably small; e.g., 1 part by mass or less, with respect to the total amount of the Al component, Si component, Group 2 element component, and rare earth element component as 100 parts by mass. So long as the object of the present invention is not impaired, the alumina-based sintered material may contain, in addition to the aforementioned unavoidable impurities, a small amount of another component such as a B component, a Ti component, an Mn component, or an Ni component.

The alumina-based sintered material containing the aforementioned components contains alumina grains serving as a main crystal phase, and a glass phase which is surrounded by a plurality of alumina grains and which serves as a grain boundary phase. Preferably, the alumina-based sintered material further contains an intermediate phase between the alumina grains and the glass phase; i.e., at the interface thereof.

The alumina grains serving as a main crystal phase preferably has a mean grain size of 2.2 to 5.2 μm and a mean aspect ratio of 1.4 to 2.2. When the alumina grains have a mean grain size falling within the above range, alumina grains are less likely to serve as breakage-causing points or breakdown-causing points, to thereby attain high mechanical strength. Also, in the insulator, the glass phase portions, which readily serve as breakage-causing points or breakdown-causing points, can be fragmented, to thereby inhibit formation of a continuous glass phase, whereby excellent withstand voltage characteristics can be attained at high temperature. When the alumina grains have a mean aspect ratio falling within the above range, alumina grains are less likely to serve as breakage-causing points or breakdown-causing points, and in the insulator, the glass phase portions, which readily serve as breakage-causing points or breakdown-causing points, can be fragmented, to thereby inhibit a continuous glass phase. For attaining more improved withstand voltage characteristics and mechanical strength, the alumina grains particularly preferably have a mean grain size of 2.8 μm to 4.2 μm, and a mean aspect ratio of 1.5 to 2.0. The mean grain size of the alumina grains may be controlled by modifying the density of a green molded product and firing temperature, and the aspect ratio may be controlled by modifying the temperature elevation rate.

The mean grain size of the alumina grains may be determined by means of a scanning electron microscope (SEM). Specifically, a surface or a certain cross-section of the alumina-based sintered material is mirror-polished, and the polished surface is subjected to thermal etching at a temperature 100° C. lower than the firing temperature for producing the alumina-based sintered material, for 10 minutes. The thus-treated surface is observed under a scanning electron microscope (SEM), and a photoimage of the observed area (×2,000) is taken. The thus-taken photoimage is subjected to "binarization (also called 2-gradation treatment)" by use of an image-analysis software application "WinROOF" (product of Mitani Corporation) through the following "binarization method" under the following "binarization conditions." As a result, the below-mentioned aluminate crystal phase and silicate crystal phase are imaged as a "low-color-density area," and the main crystal phase of alumina is imaged as a "high-color-density area." In one specific procedure, the mean grain size of the alumina grains is obtained through the intercept technique, assuming that the "high-color-density area" obtained through binarization is one crystal grain of alumina crystals, and arithmetically averaging the obtained grain size measurements.

<Binarization Method and Conditions>

(1) In the image (1,280 pixels (horizontal)×1,024 pixels (vertical)) of the surface taken through the aforementioned treatment, a secondary electron image and a reflected electron image are checked. In the case where the reflected electron image includes a combined low-color-density where two or more "high-color-density areas" adjacent to one another are merged or connected, a line is drawn along the interface between "high-color-density areas" (corresponding to the grain boundary), to thereby clarify the boundary between "high-color-density areas."

(2) For improving the reflected electron image, the reflected electron image is smoothened while the edge of each "high-color-density area" is maintained.

(3) A "threshold value" in binarization is predetermined for exclusively extracting "high-color-density areas" from the reflected electron image. More specifically, from the reflected electron image, brightness values are plotted along the horizontal axis (brightness) and occurrence values along the vertical axis, to thereby obtain a graph. Since the thus-obtained graph has a two-peak profile, the midpoint between the peaks is employed as the "threshold value."

(4) The "high-color-density areas" are extracted from a certain area (40 μm×30 μm) selected from the reflected electron images.

(5) For improving the image quality of the thus-selected area; i.e., the thus-extracted "high-color-density areas," defects shown in the selected areas are restored.

(6) From the images of the selected areas, any "high-color-density area" having a diameter of 10 pixels or less is removed.

(7) Thus, "high-color-density areas" are extracted.

The average of aspect rations of alumina grains may be derived by measuring the longer side and the shorter side of each "high-color-density area" obtained in the same manner as employed in determination of the mean grain size of alumina grains, to thereby derive the aspect ratio (longer side/shorter side), and averaging the obtained aspect ratios.

The main crystals include such alumina grains. The constitutional substance or component is alumina. The alumina content, determined through the below-mentioned line analysis, is 90 mass % or more.

The glass phase is also called a low-melting-point glass phase and is formed of a sintering aid, particularly, an Si component or the like. The glass phase is formed of $SiO_2$ as a predominant constitutional substance or component and has an $SiO_2$ content of 90 mass % or more, as determined through the below-mentioned line analysis.

The glass phase includes, as a crystal phase, at least one of an aluminate crystal phase and a silicate crystal phase, each having a grain size of 20 to 350 nm (condition (3)). When the glass phase includes nanometer-size crystal phase portions, the small-scale crystal phase portions cannot serve as breakage-causing points. In addition, the glass phase does not readily undergo plastic deformation at high temperature and exhibits high performances (e.g., withstand voltage characteristics and mechanical strength) at high temperature. Thus, the spark plug 1, which has an insulator formed of the alumina-based sintered material, exhibits excellent withstand voltage characteristics and mechanical strength, at ambient temperature and high temperature, and the withstand voltage characteristics and mechanical strength are not impaired at high temperature, as compared with those at ambient temperature, even when the spark plug 1 is set in a conventional internal combustion engine or an internal combustion engine of a small-scale and/or a high-output mode, or even when the spark plug 1 comes into contact with an easily volatile component vaporized through combustion in a combustion chamber, resulting in rapid cooling of the surface area.

A crystal phase portion having a grain size falling outside the range of 20 to 350 nm; particularly, a crystal phase portion having a grain size in excess of 350 nm, readily serves as a breakage-causing point. Therefore, such a crystal phase portion is not preferred, and should be removed to a maximum possible extent from the glass phase. Thus, in the present invention, most of the crystal phase portions present in the glass phase have a grain size of 20 to 350 nm, so as to attain more improved withstand voltage characteristics and mechanical strength. In order to consistently attain further improved withstand voltage characteristics and mechanical strength, similar to the below-mentioned grain size measurement, all the crystal phase portions present in one observation field (180×250 μm) of a polished surface of the alumina-based sintered material under a scanning electron microscope (SEM) preferably have a grain size of 20 to 350 nm. More preferably, all the crystal phase portions present in n (n is an integer of 20 or less, preferably 16 or more) of 20 arbitrarily selected observation fields (180×250 μm) of the polished surface preferably have a grain size of 20 to 350 nm. Particularly preferably, all the crystal phase portions present in 20 of 20 arbitrarily selected observation fields (180×250 μm) of the polished surface preferably have a grain size of 20 to 350 nm. In the present invention, so long as the object of the present invention is not impaired, several crystal phase portions having a grain size in excess of 350 nm, particularly, those having a grain size in excess of 350 nm and 800 nm or less, may be present in one observation field.

The grain size of the crystal phase may be determined by observing arbitrarily several selected areas under a scanning electron microscope (SEM). More specifically, similar to the determination of the mean grain size of alumina grains, the grain size of the crystal phase may be determined through the intercept technique, assuming that the "high-color-density area" obtained through binarization so as to correspond to a glass phase, and the "low-color-density area" in the same manner corresponds to an aluminate crystal phase or silicate crystal phase, each of the extracted "low-color-density areas" being a crystal grain in the crystal phase. Notably, the crystal phase portions having a grain size falling within the aforementioned range may be deposited in the glass phase though modifying the Si component content of the raw material powder (condition (I)), the rare earth element component content of the same powder; in particular, condition (II), cooling conditions after sintering, etc.

The crystal phase preferably has an area ratio of the total area of the glass phase to the total area of the crystal phase [(the total area of the glass phase)/(the total area of the crystal phase)] of 1.15 to 1.45, particularly preferably 1.22 to 1.40. When the area ratio [(the total area of the glass phase)/(the total area of the crystal phase)] satisfies the above condition, excellent withstand voltage characteristics and mechanical strength can be maintained even at high temperature, and consistency in withstand voltage characteristic and mechanical strength at high temperature increases. The area ratio may be tuned by modifying the temperature-lowering rate upon firing. In the present invention, the area of the glass phase does not include the area of the crystal phase.

The area ratio may be determined through the following procedure. Specifically, the insulator 3 formed of alumina-based sintered material is cut along the axial direction, and the cut surface is mirror-polished. The mirror-polished surface is observed under a scanning electron microscope (SEM) (e.g., acceleration voltage: 20 kV, spot size: 50, and COMPO image (composition image)), to thereby obtain a photoimage covering the entire polished surface. The area of the crystal phase and that of the glass phase in the image are measured, to thereby determine the area ratio. The area of the crystal phase may be measured through, for example, by use of Analysis Five (product of Soft Imaging System GmbH). When this graphic analysis software is employed, the threshold value is predetermined so that crystal portions are selected in the entire image of the polished surface. Through predetermination of the threshold value, binarization is performed such that the glass phase corresponds to the "high-color-density area," and the aluminate crystal phase or silicate crystal phase corresponds to the "low-color-density area."

(1) In the image (1,280 pixels (horizontal)×1,024 pixels (vertical)) of the polished surface, a secondary electron image and a reflected electron image are checked. In the case where the reflected electron image includes a combined low-color-density where two or more "high-color-density areas" adjacent to one another are merged or connected, a line is drawn along the interface between "high-color-density areas" (corresponding to the grain boundary), to thereby clarify the boundary between "high-color-density areas."

(2) For improving the reflected electron image, the reflected electron image is smoothened while the edge of each "high-color-density area" is maintained.

(3) A "threshold value" in binarization is predetermined for exclusively extracting "high-color-density areas" from the reflected electron image. More specifically, from the reflected electron image, brightness values are plotted along the horizontal axis (brightness) and occurrence values along the vertical axis, to thereby obtain a graph. Since the thus-obtained graph has a two-peak profile, the midpoint between the peaks is employed as the "threshold value."

In order to attain the object of the present invention, the crystal phase has a grain size falling within the range, and the state of dispersion of crystal phase portions and the like are not particularly limited to a certain uniform dispersion state.

The crystal phase may be at least one of the aluminate crystal phase and the silicate crystal phase. Needless to say, both the aluminate crystal phase and the silicate crystal phase may be co-present.

The aluminate crystal phase is a crystal phase containing an Al component, a Group 2 element component, and/or a rare earth element component. An example of the aluminate crystal phase is a hexaaluminate having high melting point and a β-alumina structure. The hexaaluminate crystal has a compositional formula represented by $RE(2A)_x(Al)_yO_z$ (wherein x, y, and z are 0 to 2.5, 11 to 16, and 18 to 28, respectively, and "2A" represents a Group 2 element, the Group included in the periodic table defined by Recommendations 1990, IUPAC). Examples thereof include crystal phases such as $RE(2A)Al_{13}O_{19}$ and $REAl_{11}O_{18}$.

The aluminate crystal containing no rare earth element component is, for example, an aluminate crystal containing a Group 2 element component. The aluminate crystal containing a Group 2 element component has a compositional formula, for example, $(2A)_x(Al)_yO_z$ (x, y, and z have the same meaning as defined above). Examples thereof include crystal phases such as $MgAl_{12}O_{19}$ and $CaAl_{12}O_{19}$.

The silicate crystal phase is a crystal phase containing an Si component. An example thereof is a silicate crystal containing a Group 2 element component. The silicate crystal is a crystal phase having a compositional formula represented by, for example, $(2A)SiO_3$ (wherein "2A" represents a Group 2 element, the Group included in the periodic table defined by Recommendations 1990, IUPAC). Specific examples thereof include a calcium silicate crystal phase and a magnesium silicate crystal phase.

The aluminate crystal phase and silicate crystal phase may be identified through the following procedure. Specifically, the crystal phases of the alumina-based sintered material may be confirmed through element analysis by means of, for example, an energy dispersive X-ray analyzer (EDX) (product of EDAX, EDX: "Genesis 4000," detector: SUTW3.3RTEM) combined with a transmission electron microscope (TEM) (product of HITACHI, model "HD-2000") under the following measurement conditions. <Measurement conditions, etc.> (1) Acceleration voltage: 200 kV; (2) Irradiation mode: HR (spot size: about 0.3 nm); and (3) Measurements by means of an energy dispersive X-ray analyzer (EDX) calculated as oxide-reduced mass %. The oxide(s) other than the Group 2 element component, the rare earth element component, or the Al component in an amount (oxide-reduced mass %) of 1 mass % or less is/are considered as an impurity/impurities. The total amount of Group 2 element component (by mole), the amount of Al component (by mole), and the theoretical (i.e., in the case of free of oxygen defects) amount of oxygen component (by mole) are represented by x, y, and z, respectively, when the amount of rare earth element component is 1 mol.

The presence of aluminate crystals and silicate crystals may be identified by use of X-ray diffraction chart obtained through X-ray diffractometry compared with the JCPDS cards. Notably, since no data is found in the JCPDS cards with respect to a Pr component and an Nd component, such a component cannot be directly identified through X-ray diffractometry. However, since the ionic radius of $Pr^{3+}$ and that of $Nd^{3+}$ are almost equivalent to that of $La^{3+}$, an aluminate crystal containing a Pr component and an Nd component exhibits an X-ray diffraction spectrum similar to that of an aluminate crystal containing an La component shown in the JCPDS card thereof (No. 33-699). Thus, the aluminate crystal containing a Pr component and an Nd component can be identified with reference to the JCPDS card of the aluminate crystal containing an La component. The X-ray diffractometry may be performed by means of; for example, MiniFLex (product of Rigaku) under the following conditions: measurement angle range; 20 to 70°, voltage; 30 kV, current; 15 mA, scanning speed; 1, and step; 0.02.

The aluminate crystal and silicate crystal may be produced from aluminate and/or silicate in the form of raw material powder. During firing of the raw material powder, considerable anisotropic grain growth occurs, and the grown crystals have a nanometer-scale grain size. Therefore, these crystals are preferably deposited in the course of firing the raw material powder. In one mode, when the raw material powder satisfying the conditions (1) and (2) is sintered, aluminate crystals and/or silicate crystals having grain sizes falling within the ranges can be formed via crystallization.

The intermediate phase, which the alumina-based sintered material preferably includes, has a thickness of 1 to 10 μm and is present between the main crystal phase (i.e., alumina grains) and the glass phase. When the alumina-based sintered material is subjected to line analysis in the following manner, the intermediate phase is identified to be a region in which both the ratio of the Al component content to the sum of the Al component content and the Si component content, and the ratio of the Si component content to the sum of the Al component content and the Si component content, are less than 90 mass %. The composition of the intermediate phase ranges from the composition of the main crystal phase to that of the glass phase. In the case where the intermediate phase has a thickness of 1 to 10 μm along the line analysis direction, the total strength of the grain boundary phase is enhanced, whereby the alumina-based sintered material has resistance to plastic deformation even at high temperature, resulting in further enhancement in withstand voltage characteristic and mechanical strength. In order to prevent a drop in impairment of withstand voltage characteristic and mechanical strength at high temperature to attain further enhanced properties, the intermediate phase preferably has a layer thickness of 3 to 8 μm. The intermediate phase may be formed through, for example, reaction between alumina grains and a certain aid, and the thickness of the intermediate phase may be adjusted by modifying, for example, grain size ratios.

<Method of Line Analysis>

By means of a scanning electron microscope (SEM) and an electron probe microanalyzer (EPMA), the Al element intensity and the Si element signal intensity are measured at irradiation points (step (interval): 0.005 μm) on a selected line of the interface between the main crystal phase (i.e., alumina grains) and the glass phase of the alumina-based sintered material. Based on the measurements, the measurements of a region in which the Al element signal intensity and the Si element signal intensity are less than 90% are extracted. Then, based on the extracted measurements, the analytical distance and the approximate line representing the ratio of the Al element signal intensity or the Si element signal intensity to the sum of the Al element signal intensity and the Si element signal intensity are obtained. Subsequently, from the approximate line, there is obtained the analytical distance (L1) in the case where the ratio of the Si element signal intensity to the sum (100%) of the Al element signal intensity and the Si element signal intensity is less than 90%, and the ratio of the Al element signal intensity to the sum (100%) of the Al element signal intensity and the Si element signal intensity decreases to 90%. Similarly, there is obtained the analytical distance (L2) in the case where the ratio of the Al element signal intensity to the sum (100%) of the Al element signal intensity and the Si element signal intensity is less than 90%, and the ratio of the Si element signal intensity to the sum (100%) of the Al element signal intensity and the Si element signal intensity increases to 90%. The layer thickness of the intermediate phase is defined by the distance between L1 and L2. The procedure is carried out on 10 arbitrarily selected lines in total, and the average value is employed as the layer thickness of the intermediate phase included in the alumina-based sintered material. The measurement conditions include an acceleration voltage of 20 kV and a spot size of 65 μm. In the line analysis, the sum of the Al element signal intensity and the Si element signal intensity corresponds to the sum of the Al element content and the Si element content, and the ratio of the Al element signal intensity or the Si element signal intensity to the sum of the Al element signal intensity and the Si element signal intensity corresponds to the Al content or Si content of the alumina-based sintered material.

The alumina-based sintered material preferably has a plastic deformation temperature of 850 to 1,050° C., particularly preferably 920 to 1,050° C. When the alumina-based sintered material has a plastic deformation temperature satisfying the above conditions, the glass phase present in the material has resistance to plastic deformation at plastic deformation temperature, whereby the alumina-based sintered material has also resistance to plastic deformation even at high temperature, thereby attaining further improved withstand voltage characteristics and mechanical strength at high temperature. The plastic deformation temperature may be tuned through modifying the grain sizes and compositional proportions of constitutional elements, crystal distribution, and other factors. The plastic deformation temperature is defined as a temperature at which an alumina-based sintered material exhibits a variation in displacement of 4,000 N/mm, when the alumina-based sintered material is locally heated under a load of 300 N. Thus, the plastic deformation temperature is not a temperature at which the alumina-based sintered material undergoes plastic deformation. The plastic deformation temperature may be tuned through modifying the conditions (1) to (3) within the scope of the present invention.

The alumina-based sintered material satisfies at least the conditions (1) to (3). Thus, when the insulator of a spark plug is formed from the material, the insulator exhibits excellent withstand voltage characteristics and mechanical strength at ambient temperature and high temperature, and the withstand voltage characteristics and mechanical strength at high temperature are comparable to those at ambient temperature.

The spark plug of the present invention is produced through a method including a step of producing an insulator, the step including preparing a raw material powder containing, as predominant components, an Al compound powder and an Si compound powder, and a Group 2 element compound powder (hereinafter may be referred to as a Group 2 compound powder), the Group included in the periodic table defined by Recommendations 1990, IUPAC, and a rare earth element compound, at specific compositional proportions; compacting the raw material powder; and sintering the compact. Hereinafter, the method of producing a spark plug 1, which is an embodiment of the spark plug of the present invention will be described in detail.

The spark plug 1 is produced from a raw material powder containing an Al compound powder, an Si compound powder, a Group 2 element compound powder, and a rare earth element compound, in amounts satisfying the conditions (I) and (II) below. When the raw material powder contains components so as to satisfy the below-mentioned conditions (I) and (II), aluminate crystals and/or silicate crystals having a grain size of 20 to 350 nm can be formed in the glass phase during firing the raw material powder. In a specific procedure, a raw material powder including an Al compound powder, an Si compound powder, a Group 2 element compound powder, and a rare earth element compound is mixed in a slurry. In another procedure, powders of the same substance as the Al component, the same substance as the Si component, the same substance as the RE component, and the same substance as the Group 2 element component (these powders may also be referred to as raw material powders) are mixed. The proportions of the powders are predetermined so that the conditions (I) and (II) are satisfied, and preferably fall within the aforementioned component contents. Mixing is preferably performed for 8 hours or longer, so that the mixing state of the raw material powder becomes uniform, and the formed sintered body has high density. (I): 0.25≤ oxide-reduced amount (mass %) of the Si compound powder ≤1.25, and (II): 1.35≤ [(oxide-reduced amount of the Si compound powder)/((oxide-reduced amount of the Group 2 element compound powder)/(oxide-reduced amount of the rare earth element compound))]≤7.5.

No particular limitation is imposed on the Al compound powder, so long as it is a powder of a compound which forms an Al component through firing. Generally, alumina ($Al_2O_3$) powder is employed. Actually, Al compound powder might contain unavoidable impurities (e.g., Na). Therefore, the Al compound powder preferably has high purity, for example, 99.5% or higher. In order to yield a high-density alumina-based sintered material, generally, an Al compound powder having a mean particle size of 0.1 μm to 5.0 μm is preferably employed. The mean particle size is determined through the laser diffraction method (Microtrac particle size distribution measuring apparatus (MT-3000), product of Nikkiso Co., Ltd.).

No particular limitation is imposed on the Si compound powder, so long as it is a powder of a compound which forms an Si component through firing. Examples of the Si compound of inorganic powder include Si oxide (including complex oxides), silicon hydroxide, silicon carbonate, silicon chloride, silicon sulfate, silicon nitrate, and silicon phosphate. Specific examples include $SiO_2$ powder. When an Si compound powder other than silicon oxide powder is employed, the amount of the powder is controlled by the unit of its oxide-reduced mass %. The purity and mean particle size of the Si compound powder are generally the same as those of the Al compound powder.

No particular limitation is imposed on the Group 2 element compound powder, so long as it is a powder of a compound which forms a Group 2 element component through firing. Examples of the Group 2 element compound of inorganic powder include Group 2 element oxides (including complex oxides thereof), Group 2 element hydroxides, Group 2 element carbonates, Group 2 element chlorides, Group 2 element sulfates, Group 2 element nitrates, and Group 2 element phosphates. Specific examples include Mg compound powders such as MgO powder and $MgCO_3$ powder, Ba compound powders such as BaO powder and $BaCO_3$ powder; Ca compound powders such as CaO powder and $CaCO_3$ powder, and Sr compound powders such as SrO powder and $SrCO_3$ powder. When a Group 2 element compound powder other than its oxide powder is employed, the amount of the powder is controlled by the unit of its oxide-reduced mass %. The purity and mean particle size of the Group 2 element compound powder are generally the same as those of the Al compound powder.

No particular limitation is imposed on the rare earth element compound powder, so long as it is a powder of a compound which forms a rare earth element component through firing. Examples of the rare earth element compound powder include powders of rare earth element oxides and complex oxides thereof. The rare earth element compound powder is formed of a compound which forms the corresponding component, and is preferably at least one component selected from the group consisting of a Y component, an La component, a Pr component, an Nd component, and a Yb component. When a rare earth element compound powder other than its oxide powder is employed, the amount of the powder is controlled by the unit of its oxide-reduced mass %. The purity and mean particle size of the rare earth element compound are generally the same as those of the Al compound powder.

The above-described raw material powder is dispersed in a solvent, and a hydrophilic binder is added to the dispersion. The thus-obtained slurry is mixed. Examples of the solvent employed for forming dispersion include water and alcohol. Examples of the hydrophilic binder include polyvinyl alcohol, water-soluble acrylic resin, gum arabic, and dextrin. These hydrophilic binders or solvents may be used singly or in combination of two or more species. The hydrophilic binder or solvent may be used in an amount of 0.1 to 5 parts by mass (preferably 0.5 to 3 parts by mass), with respect to 100 parts by mass of the raw material powder. When water is employed as a solvent, the solvent may be used in an amount of 40 to 120 parts by mass (preferably 50 to 100 parts by mass).

The mean particle size of the thus-produced slurry may be adjusted to, for example, 1.4 to 5.0 μm. Subsequently, the slurry is granulated through, for example, spray drying, to thereby adjust the mean particle size of 50 μm to 200 μm, preferably 50 μm to 150 μm. The mean particle size is determined through the laser diffraction method (Microtrac particle size distribution measuring apparatus (MT-3000), product of Nikkiso Co., Ltd.).

Subsequently, the granulated product is press-molded through, for example, rubber pressing or metal mold pressing, to thereby yield a green mold. The outer surface of the thus-obtained green mold is polished by means of resinoid grind stone or the like, to thereby work the green mold to a desired shape.

The thus-polished finished green compact having a desired shape is fired in air at 1,450 to 1,650° C. for 1 to 8 hours, to thereby yield an alumina-based sintered material. When the firing temperature is 1,450 to 1,650° C., the sintered material tends to have sufficient density, and anomalous grain growth of the alumina component is prevented, whereby the produced alumina-based sintered material reliably has excellent withstand voltage characteristics and mechanical strength. Also, when the firing time is 1 to 8 hours, the sintered material tends to have sufficient density, and anomalous grain growth of the alumina component is prevented, whereby the produced alumina-based sintered material reliably has excellent withstand voltage characteristics and mechanical strength. If needed, the shape and related properties of the thus-produced alumina-based sintered material may be modified again.

In order to form aluminate crystals and/or silicate crystals having a grain size of 20 to 350 nm in the glass phase during firing the raw material powder, particularly during cooling after firing, some techniques are employed in addition to satisfying the conditions (I) and (II). Examples of such techniques include controlling the average cooling condition from the highest firing temperature to 800° C. to 3 to 24° C./min; reducing the mean particle size of the sintering aids (i.e., Si compound powder, Group 2 element compound powder, and rare earth element compound) to 1.0 μm or less; and modifying the pH of the slurry to regulate the cohesion state of each raw material.

Through the aforementioned procedure, the alumina-based sintered material can be produced. The insulator 3 of the spark plug 1 made of the alumina-based sintered material can be produced. Since the alumina-based sintered material satisfies the aforementioned (1) to (3), the material exhibits excellent withstand voltage characteristics and mechanical strength, at ambient temperature and high temperature, and the withstand voltage characteristics and mechanical strength are not impaired at high temperature, as compared with those at ambient temperature. Therefore, the alumina-based sintered material is suitably used as an insulating material of the spark plug which is to be set in a conventional internal combustion engine or an internal combustion engine of a small-scale and/or a high-output mode.

The spark plug 1 having the insulator 3 formed of the alumina-based sintered material may be produced through, for example, the following procedure. Specifically, an electrode material such as an Ni-base alloy is worked to a specific shape, to thereby form the center electrode 2 and/or the ground electrode 6. Preparation and working of the electrode material may be performed sequentially. In one embodiment of the production, a melt of an Ni-base alloy having a composition of interest or a like material is prepared by means of a vacuum melting furnace, and an ingot is prepared from the melt through vacuum casting. The ingot is subjected to appropriate working processes such as hot working and wire drawing, to a shape and dimensions of interest, to thereby form the center electrode 2 and/or ground electrode 6. Alternatively, the inner member 8 is inserted into the cup-formed outer member 7, and the assembly is subjected to plastic working such as extrusion, whereby the center electrode 2 is formed.

Subsequently, one end of the ground electrode 6 is joined, through electric resistance welding or a similar technique, to the end surface of the metallic shell 4 formed through plastic working or the like to a shape of interest. Then, the center electrode 2 is integrated to the insulator 3 through a known technique. The insulator 3 is integrated into the metallic shell 4 to which the ground electrode 6 has been joined. Then, the forward end portion of the ground electrode 6 is bent toward the center electrode 2 so that one end of the ground electrode 6 faces the forward end portion of the center electrode 2, whereby the spark plug 1 is produced.

The spark plug 1 is employed as a spark plug of an automotive internal combustion engine such as a gasoline engine or a diesel engine. In use, the screw portion 9 is fixed to a predetermined position of a head which defines a combustion chamber of the internal combustion engine (not illustrated) by screwing the portion 9 with an internal thread provided therethrough. Since the spark plug 1 has an insulator alumina-based sintered material satisfying the aforementioned conditions (1) to (3), the spark plug exhibits excellent withstand voltage characteristics and mechanical strength, at ambient temperature and high temperature, and the withstand voltage characteristics and mechanical strength are not impaired at high temperature, as compared with those at ambient temperature. Therefore, the spark plug 1 can be employed in any type of internal combustion engines. Specifically, the spark plug can be employed in a conventional internal combustion engine, and also in an internal combustion engine of a small-scale and/or a high-output mode or the like engine, which is required to employ a screw portion 9 having a nominal diameter of M10 or less.

As described above, the spark plug of the present invention is not limited to the aforementioned embodiment and may be modified, so long as the object of the present invention can be attained. For example, the spark plug 1 is configured so that the front surface of the center electrode 2 faces one end surface of the ground electrode 6, along the axis AX of the center electrode, via the spark discharge gap G. In the present invention, alternatively, the side surface of the center electrode faces one forward end surface of the ground electrode along the radial direction of the center electrode via the spark discharge gap. In the latter case, a single ground electrode or a plurality of ground electrodes which face the side surface of the center electrode may be disposed.

The spark plug 1 has the center electrode 2 and the ground electrode 6. In the present invention, a noble metal tip may be disposed on the forward end portion of the center electrode and/or the surface of the ground electrode. The noble metal tip which is disposed on the forward end portion of the center electrode and the surface of the ground electrode generally has a cylindrical shape with appropriate dimensions and melt-fixed on the forward end portion of the center electrode and the surface of the ground electrode through an appropriate welding technique such as laser welding or electric resistance welding. A spark discharge gap is defined by the noble metal tip formed on the forward end portion of the center electrode and the noble metal tip formed on the surface of the ground electrode. Examples of the material forming the noble metal tips include noble metal materials such as Pt, Pt alloys, Ir, and Ir alloys.

EXAMPLES

Examples 1 to 19, and Comparative Examples 1 to 17

1. Production and Evaluation of Alumina-Based Sintered Materials

An alumina powder, an Si compound powder, a Group 2 element compound powder, and a rare earth compound powder were mixed together, to thereby prepare a raw material powder (species of the powders forming the raw material powder are shown in Table 1). Notably, the alumina powder has a mean particle size of 2.0 μm or less, and the Si compound powder, the Group 2 element compound powder, and the rare earth element compound powder had a mean particle size falling within the aforementioned ranges. To each raw material powder, polyvinyl alcohol and water were added, to thereby prepare a slurry.

The thus-obtained slurry was spray-dried through spray drying or a similar technique, to thereby prepare a granulated product having a mean spherical particle size of about 100 μm. Then, the granulated product was press-molded, to thereby yield a green compact, forming the insulator. The green compact was fired at 1,450° C. to 1,650° C. in air for 1 to 8 hours, and a glaze was applied onto a specific site of the fired compact, followed by firing again for finishing, to thereby produce alumina-based sintered material members of Examples 1 to 19 and Comparative Examples 1 to 17. The firing was performed under the constant conditions satisfying the aforementioned requirements. In the sintering step, cooling from the highest temperature to 800° C. was performed at an average cooling condition of 3 to 24° C./min.

(Determination of Component Contents)

The composition of each of the produced alumina-based sintered materials; i.e., amounts of constitutional components, was quantitated through EPMA. Each alumina-based sintered material was observed at 20 vision fields (unit vision field: 180 μm×250 μm). The component contents obtained from the vision fields were arithmetically averaged, to thereby obtain each component content. Each component (mass %) was calculated with respect to the total component contents as 100 mass %. TABLE 1 shows the results (COMPOSITION (mass %, oxide-reduced)). Also, the ratio "(oxide-reduced amount (mass %) of the Si component)/((oxide-reduced amount (mass %) of the Group 2 element component)/(oxide-reduced amount (mass %) of the rare earth element component))" was calculated, and the results are shown in TABLE 1 ("Si COMPONENT RATIO). Notably, the component contents shown in TABLE 1 virtually coincided with the compositional proportions of the raw material powder.

TABLE 1

| | COMPOSITION (mass %, OXIDE-REDUCED) | | | | | | | | | | | SI COMPNT. RATIO |
|---|---|---|---|---|---|---|---|---|---|---|---|---|
| | Al$_2$O$_3$ | SiO$_2$ | MgO | BaO | CaO | SrO | La$_2$O$_3$ | Nd$_2$O$_3$ | Pr$_2$O$_3$ | Y$_2$O$_3$ | Yb$_2$O$_3$ | |
| EX. 1 | 99.11 | 0.25 | 0.10 | | | | 0.54 | | | | | 1.35 |
| EX. 2 | 96.77 | 1.25 | 0.05 | 0.43 | | | | 1.50 | | | | 3.91 |
| EX. 3 | 98.51 | 0.96 | 0.12 | | 0.10 | | | | 0.31 | | | 1.35 |
| EX. 4 | 96.28 | 0.84 | | 0.16 | | 0.13 | | | | 2.59 | | 7.50 |
| EX. 5 | 98.75 | 0.48 | 0.08 | | 0.11 | | | | | 0.58 | | 1.47 |
| EX. 6 | 98.33 | 0.52 | | 0.14 | 0.16 | | | 0.85 | | | | 1.47 |
| EX. 7 | 98.50 | 0.40 | 0.12 | | 0.05 | 0.08 | | | 0.85 | | | 1.36 |
| EX. 8 | 97.00 | 0.92 | 0.11 | 0.22 | 0.14 | 0.09 | | | | 1.52 | | 2.50 |
| EX. 9 | 97.30 | 0.88 | 0.14 | | 0.26 | 0.22 | | | | 1.22 | | 1.69 |
| EX. 10 | 97.43 | 0.71 | | 0.08 | 0.08 | 0.14 | | 1.56 | | | | 3.69 |
| EX. 11 | 97.68 | 0.94 | 0.08 | 0.11 | | 0.23 | 0.96 | | | | | 2.15 |
| EX. 12 | 97.12 | 1.18 | 0.08 | 0.12 | | 0.06 | | 1.44 | | | | 6.54 |
| EX. 13 | 97.61 | 0.99 | 0.06 | | 0.21 | 0.08 | | | | | 1.05 | 2.97 |
| EX. 14 | 98.32 | 0.58 | 0.04 | 0.06 | | 0.12 | | | | 0.88 | | 2.32 |
| EX. 15 | 97.82 | 0.46 | | 0.06 | 0.12 | | | | 1.54 | | | 3.94 |
| EX. 16 | 97.75 | 0.73 | | | | 0.20 | | | | | 1.32 | 4.82 |
| EX. 17 | 97.71 | 0.69 | | 0.31 | | | 1.29 | | | | | 2.87 |
| EX. 18 | 97.76 | 0.88 | 0.02 | | 0.14 | 0.12 | | 1.08 | | | | 3.39 |
| EX. 19 | 97.98 | 0.81 | | 0.06 | 0.23 | | | | | 0.92 | | 2.57 |
| COMP. 1 | 99.14 | 0.22 | 0.09 | | | | 0.55 | | | | | 1.34 |
| COMP. 2 | 95.24 | 1.28 | 0.05 | 0.43 | | | | 3.00 | | | | 8.00 |
| COMP. 3 | 98.89 | 0.60 | 0.12 | | 0.10 | 0.05 | | | 0.24 | | | 0.53 |
| COMP. 4 | 95.21 | 0.84 | | 0.16 | 0.10 | 0.13 | | | | | 3.56 | 7.67 |
| COMP. 5 | 98.24 | 0.22 | 0.08 | | 0.07 | 0.04 | | | | 1.35 | | 1.56 |
| COMP. 6 | 96.32 | 1.32 | 0.24 | 0.14 | 0.32 | | | 1.66 | | | | 3.13 |
| COMP. 7 | 96.64 | 0.78 | 0.12 | | 0.18 | 0.15 | | | 2.13 | | | 3.69 |
| COMP. 8 | 96.98 | 0.88 | 0.11 | 0.22 | 0.25 | 0.09 | | | | | 1.47 | 1.93 |
| COMP. 9 | 98.28 | 0.86 | 0.14 | | 0.26 | 0.11 | | | | 0.35 | | 0.59 |
| COMP. 10 | 98.18 | 1.00 | 0.09 | 0.08 | 0.08 | 0.14 | | 0.43 | | | | 1.10 |
| COMP. 11 | 97.25 | 1.27 | 0.13 | 0.06 | | 0.09 | 1.20 | | | | | 5.44 |
| COMP. 12 | 97.72 | 0.24 | | 0.10 | 0.12 | 0.06 | | 1.76 | | | | 1.51 |
| COMP. 13 | 98.12 | 1.29 | 0.08 | | | 0.29 | | | | | 0.22 | 0.77 |
| COMP. 14 | 99.03 | 0.20 | | 0.22 | 0.12 | | | | | 0.43 | | 0.25 |
| COMP. 15 | 97.95 | 0.24 | | 0.14 | 0.11 | | 1.56 | | | | | 1.50 |
| COMP. 16 | 97.96 | 0.58 | 0.12 | 0.11 | | 0.11 | | 1.12 | | | | 1.91 |
| COMP. 17 | 98.59 | 0.66 | 0.15 | 0.07 | 0.12 | | | | 0.41 | | | 0.80 |

(Grain Size of Crystal Phase Portions)

A cut surface of each alumina-based sintered member was mirror-polished, and the polished surface was subjected to thermal etching for 10 minutes at a temperature 100° C. lower than the firing temperature. A selected vision field (180×250 µm) of the thus-treated surface was observed under a scanning electron microscope (SEM), and a ×2,000 photoimage was taken. The photoimage was subjected to binarization as described above, whereby "low-color-density areas" were extracted. The grain size of the grains was determined through the intercept technique, assuming that the "high-color-density area" obtained through binarization is one crystal grain. The ratio of the maximum grain size to the minimum grain size of the obtained grain sizes (MAX/MIN) was calculated. The results are shown in TABLE 2. In a similar manner, the grain size of the crystal phase of each of the alumina-based sintered materials of Examples 1 to 19 was determined from 20 selected vision fields. As a results, no crystal phase having a grain size larger than 350 nm was observed in all vision fields of the alumina-based sintered members.

(Area Ratio of Crystal Phase)

In a manner generally similar to that employed in determination of the "grain size of the crystal phase," a photoimage of the "entire treated surface" was taken. The obtained photoimage was processed by use of image-analysis software, to thereby determine the area ratio of the crystal phase to the glass phase. The results are shown in TABLE 2 as "AREA RATIO."

(Detection of Crystal Phase)

A cut surface of each alumina-based sintered member was mirror-polished, and the polished surface was subjected to X-ray analysis in the aforementioned manner by means of an X-ray diffractometer (model: MiniFlex, product of Rigaku). Through comparison of the thus-obtained X-ray diffraction chart with the JCPDS card, the presence of aluminate crystals and/or silicate crystals was confirmed in the glass phase of each alumina-based sintered material.

(Mean Grain Size and Aspect Ratio of Alumina Grains)

In a manner generally similar to that employed in determination of the "grain size of the crystal phase," the thus-treated surface of each alumina-based sintered member was observed under a scanning electron microscope (SEM), and a photoimage of the treated surface was taken. The grain sizes of the grains were determined through the intercept technique, assuming that the "high-color-density area" obtained through binarization of the photoimage is one crystal grain, and the measurements were arithmetically averaged, whereby the mean grain size of alumina grains was obtained. The results are shown in TABLE 2 as "GRAIN SIZE." Also, the longer side and the shorter side of each "high-color-density area" were measured, and the aspect ratio (longer side/shorter side) was calculated. The aspect ratio measurements were arithmetically averaged, whereby the "aspect ratio (longer side/ shorter side)" was obtained. TABLE 2 shows the results.

(Thickness of Intermediate Phase)

Each alumina-based sintered member was subjected to the aforementioned line analysis, and the Al element signal intensity and the Si element signal intensity were measured. An area where both the ratio of the Al element signal intensity to the sum of the Al element signal intensity and the Si element signal intensity, and the ratio of the Si element signal intensity to the sum of the Al element signal intensity and the Si element signal intensity are less than 90 mass % are employed as the "intermediate phase." The aforementioned analytical distances L1 and L2 of the area were determined, and the layer thickness of the intermediate phase was obtained from the distance between L1 and L2. The procedure was carried out on 10 arbitrarily selected lines in total, and the arithmetically averaged value was employed as the layer thickness of the intermediate phase. TABLE 2 shows the results.

(Plastic Deformation Temperature)

The plastic deformation temperature of each alumina-based sintered material was determined through local high-frequency heating of the corresponding sintered member. TABLE 2 shows the results.

(Heat Impact Characteristics)

Each alumina-based sintered member was heated at 800° C. by means of a burner, and then quenched at a cooling rate which was modified by 5° C./sec. The cooling rate at which the alumina-based sintered material underwent cracking was determined. The results are shown in TABLE 2 as "QUENCH FROM 800° C."

(Withstand Voltage Test)

Figure 2:
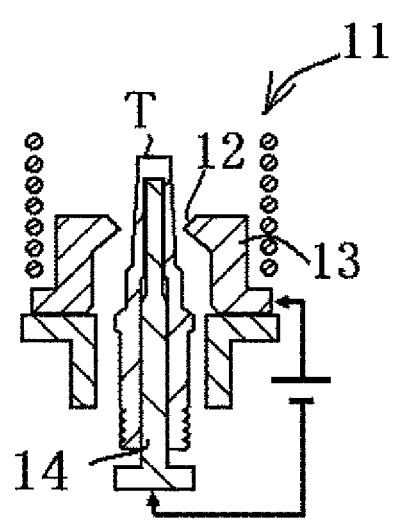
FIG. 2 is an end view schematically showing a withstand voltage measuring apparatus employed for determining withstand voltage characteristics in the Examples.

In a manner similar to that employed in production of alumina-based sintered members of Examples 1 to 19 and Comparative Examples 1 to 17, test pieces T each formed of an insulator and having a closed front end were fabricated. The withstand voltage (kV) of each test peace T was measured at 25° C., 600° C., 700° C., 800° C., and 900° C., by means of a withstand voltage measuring apparatus 11 shown in FIG. 2. As shown in FIG. 2, the withstand voltage measuring apparatus 11 has a metallic circular member 12 in which surrounds, with space, the forward end portion of the test piece T, and a heater 13 for heating the test piece T. A center electrode 14 was inserted to the forward end of the axial hole of the test piece T, and the circular member 12 was placed so as to surround the forward end portion of the test piece T. In this setting, the withstand voltage of the test piece T; i.e., alumina-based sintered material, was measured. More specifically, the forward end portion of the test piece T was heated to the aforementioned predetermined temperature by means of the heater 13. When the circular member 12 reached a predetermined temperature, voltage was applied between the center electrode 14 and the circular member 12. When the test piece T underwent insulation breakdown; that is, the test piece T did not work as an insulator and impeded elevation of voltage, the voltage was measured and employed as the with-

TABLE 2

| | CRYSTAL (nm) MAX/MIN | AREA RATIO | QUENCH FROM 800° C. (° C./sec) | INTMED. PHASE THICKNESS (μm) | GRAIN SIZE (μm) | ASPECT RATIO (long/short) | PLASTIC DEFORMN. TEMP. (° C.) |
|---|---|---|---|---|---|---|---|
| EX. 1 | 350/60 | 1.02 | 170 | 0.5 | 5.5 | 2.7 | 1100 |
| EX. 2 | 290/20 | 1.56 | 210 | 16 | 2.1 | 2.8 | 780 |
| EX. 3 | 350/20 | 1.11 | 165 | 0.5 | 6.2 | 2.5 | 1080 |
| EX. 4 | 280/100 | 1.52 | 205 | 18 | 2 | 1.3 | 830 |
| EX. 5 | 330/60 | 1.57 | 210 | 20 | 2.1 | 1.2 | 820 |
| EX. 6 | 340/30 | 1.62 | 215 | 19 | 2.1 | 2.5 | 800 |
| EX. 7 | 310/110 | 1.15 | 200 | 16 | 5.9 | 2.4 | 920 |
| EX. 8 | 320/50 | 1.45 | 215 | 17 | 6.1 | 2.6 | 900 |
| EX. 9 | 340/20 | 1.32 | 220 | 16 | 6.3 | 2.7 | 970 |
| EX. 10 | 300/90 | 1.22 | 215 | 1 | 4.7 | 2.5 | 1000 |
| EX. 11 | 320/90 | 1.27 | 220 | 10 | 5 | 2.8 | 920 |
| EX. 12 | 290/60 | 1.31 | 230 | 6 | 3.7 | 2.6 | 880 |
| EX. 13 | 350/40 | 1.28 | 225 | 7 | 3.2 | 2.7 | 850 |
| EX. 14 | 320/80 | 1.22 | 230 | 5 | 2.8 | 2.5 | 870 |
| EX. 15 | 300/60 | 1.19 | 225 | 9 | 2.2 | 1.4 | 850 |
| EX. 16 | 310/40 | 1.25 | 225 | 9 | 3.6 | 2.2 | 1050 |
| EX. 17 | 330/50 | 1.32 | 230 | 8 | 4.8 | 1.5 | 920 |
| EX. 18 | 320/60 | 1.38 | 220 | 3 | 5.2 | 1.7 | 960 |
| EX. 19 | 310/30 | 1.4 | 225 | 6 | 4.2 | 2.0 | 980 |
| COMP. 1 | 420/10 | 1.02 | 150 | 0.5 | 6.4 | 2.3 | 1100 |
| COMP. 2 | 380/10 | 1.49 | 170 | 20 | 6.4 | 2.5 | 820 |
| COMP. 3 | 350/30 | 1.1 | 160 | 0.8 | 7.2 | 2.6 | 1100 |
| COMP. 4 | 340/40 | 1.64 | 190 | 17 | 6.5 | 2.9 | 800 |
| COMP. 5 | 350/30 | 0.92 | 140 | 0.5 | 8.6 | 3.1 | 1090 |
| COMP. 6 | 350/40 | 1.09 | 160 | 21 | 7.2 | 3.0 | 840 |
| COMP. 7 | 460/10 | 1.47 | 150 | 18 | 6.9 | 3.5 | 820 |
| COMP. 8 | 400/10 | 1.12 | 130 | 16 | 5.9 | 2.3 | 800 |
| COMP. 9 | 360/10 | 1.51 | 170 | 16 | 6.7 | 2.5 | 830 |
| COMP. 10 | 390/10 | 1.46 | 180 | 16 | 6.9 | 2.7 | 820 |
| COMP. 11 | 380/10 | 1.12 | 170 | 15 | 6.8 | 2.5 | 800 |
| COMP. 12 | 420/10 | 1.14 | 160 | 14 | 6.4 | 2.3 | 840 |
| COMP. 13 | 340/50 | 1.22 | 150 | 16 | 6.6 | 2.5 | 820 |
| COMP. 14 | 330/40 | 1.51 | 170 | 17 | 6 | 2.4 | 830 |
| COMP. 15 | 300/50 | 1.23 | 170 | 7 | 4.8 | 1.6 | 880 |
| COMP. 16 | 590/10 | 1.28 | 180 | 5 | 5 | 1.7 | 920 |
| COMP. 17 | 350/20 | 1.32 | 160 | 4 | 5.1 | 2.2 | 940 | stand voltage. TABLE 3 shows the measured withstand voltage values. Also, a percent drop in withstand voltage with respect to the measurement at 25° C. [[(withstand voltage at given temperature)−(withstand voltage at 25° C.)]/(withstand voltage at given temperature] was calculated. TABLE 3 shows the results.
(Mechanical Strength)

In a manner similar to that employed in production of alumina-based sintered members of Examples 1 to 19 and Comparative Examples 1 to 17, test pieces (36 mm×4 mm×3 mm) were fabricated. In accordance with the measurement methods described in JIS R1601 and JIS A1604, the 3-point bending strength of each test piece was measured at 25° C., 600° C., 700° C., 800° C., and 900° C. (span: 30 mm, "STRENGTH" in TABLE 4). Also, a percent drop in strength with respect to the measurement at 25° C. [[(strength at given temperature)−(strength at 25° C.)]/(strength at given temperature] was calculated. TABLE 4 shows the results.

TABLE 3

| | WITHSTAND VOLTAGE (kV) | | | | | WITHSTAND VOLTAGE DROP (%) | | | |
|---|---|---|---|---|---|---|---|---|---|
| | 25° C. | 600° C. | 700° C. | 800° C. | 900° C. | 600° C. | 700° C. | 800° C. | 900° C. |
| EX. 1 | 45.6 | 42.9 | 41.3 | 36.8 | 30.9 | 5.9 | 9.5 | 19.2 | 32.2 |
| EX. 2 | 46.2 | 43.5 | 40.6 | 37.1 | 31.1 | 5.8 | 12.2 | 19.6 | 32.6 |
| EX. 3 | 45.8 | 43.2 | 41.5 | 36.9 | 30.8 | 5.6 | 9.3 | 19.4 | 32.8 |
| EX. 4 | 45.6 | 43.0 | 39.3 | 36.8 | 31.0 | 5.7 | 13.8 | 19.2 | 32.0 |
| EX. 5 | 45.3 | 42.7 | 39.3 | 36.4 | 30.1 | 5.7 | 13.2 | 19.6 | 33.6 |
| EX. 6 | 45.2 | 42.6 | 39.1 | 36.5 | 30.1 | 5.8 | 13.4 | 19.3 | 33.3 |
| EX. 7 | 49.5 | 47.3 | 44.6 | 42.0 | 34.6 | 4.5 | 9.8 | 15.1 | 30.2 |
| EX. 8 | 50.2 | 47.9 | 45.3 | 41.6 | 34.9 | 4.6 | 9.7 | 17.2 | 30.4 |
| EX. 9 | 49.6 | 47.2 | 44.9 | 40.8 | 34.6 | 4.8 | 9.5 | 17.7 | 30.2 |
| EX. 10 | 52.6 | 50.2 | 48.0 | 44.8 | 37.6 | 4.5 | 8.8 | 14.9 | 28.5 |
| EX. 11 | 53.4 | 51.1 | 48.8 | 45.6 | 38.3 | 4.4 | 8.7 | 14.7 | 28.2 |
| EX. 12 | 52.6 | 50.3 | 48.0 | 44.9 | 37.8 | 4.4 | 8.8 | 14.6 | 28.1 |
| EX. 13 | 52.6 | 50.3 | 47.9 | 44.9 | 38.0 | 4.3 | 8.9 | 14.7 | 27.8 |
| EX. 14 | 52.2 | 49.9 | 47.8 | 44.6 | 37.8 | 4.4 | 8.4 | 14.5 | 27.6 |
| EX. 15 | 56.7 | 54.3 | 52.1 | 49.4 | 45.6 | 4.3 | 8.2 | 12.9 | 19.6 |
| EX. 16 | 56.3 | 53.9 | 51.6 | 49.1 | 45.2 | 4.2 | 8.4 | 12.8 | 19.8 |
| EX. 17 | 56.9 | 54.3 | 52.3 | 49.7 | 45.7 | 4.5 | 8.1 | 12.6 | 19.6 |
| EX. 18 | 57.6 | 55.1 | 52.9 | 50.4 | 46.4 | 4.4 | 8.2 | 12.5 | 19.5 |
| EX. 19 | 56.8 | 54.4 | 52.2 | 49.6 | 45.9 | 4.3 | 8.1 | 12.6 | 19.2 |
| COMP. 1 | 44.8 | 40.9 | 37.5 | 34.2 | 24.5 | 8.8 | 16.3 | 23.6 | 45.3 |
| COMP. 2 | 45.2 | 41.0 | 38.3 | 33.8 | 24.2 | 9.2 | 15.2 | 25.2 | 46.4 |
| COMP. 3 | 44.6 | 40.1 | 38.0 | 33.6 | 23.5 | 10.0 | 14.9 | 24.7 | 47.3 |
| COMP. 4 | 45.9 | 41.5 | 39.1 | 34.2 | 24.8 | 9.6 | 14.8 | 25.5 | 46.0 |
| COMP. 5 | 43.8 | 39.8 | 37.1 | 32.2 | 23.6 | 9.2 | 15.4 | 26.4 | 46.2 |
| COMP. 6 | 46.2 | 41.9 | 39.8 | 34.9 | 20.4 | 9.3 | 13.8 | 24.4 | 55.9 |
| COMP. 7 | 44.3 | 39.9 | 38.1 | 33.7 | 25.0 | 9.9 | 14.1 | 24.0 | 43.6 |
| COMP. 8 | 45.2 | 41.1 | 38.5 | 34.6 | 24.4 | 9.1 | 14.9 | 23.5 | 46.0 |
| COMP. 9 | 44.6 | 40.6 | 38.0 | 33.4 | 24.3 | 9.0 | 14.9 | 25.2 | 45.5 |
| COMP. 10 | 44.9 | 41.4 | 37.4 | 33.3 | 25.6 | 7.8 | 16.7 | 25.8 | 42.9 |
| COMP. 11 | 44.8 | 41.2 | 36.6 | 33.2 | 26.4 | 8.0 | 18.3 | 25.9 | 41.1 |
| COMP. 12 | 45.0 | 40.8 | 37.6 | 34.2 | 24.8 | 9.3 | 16.4 | 24.0 | 44.9 |
| COMP. 13 | 45.2 | 41.0 | 37.8 | 33.6 | 25.6 | 9.3 | 16.4 | 25.7 | 43.4 |
| COMP. 14 | 45.3 | 41.6 | 38.2 | 33.8 | 25.4 | 8.2 | 15.7 | 25.4 | 43.9 |
| COMP. 15 | 46.2 | 42.2 | 38.4 | 34.6 | 23.4 | 8.7 | 16.9 | 25.1 | 49.4 |
| COMP. 16 | 45.8 | 41.4 | 37.8 | 33.8 | 24.2 | 9.6 | 17.5 | 26.2 | 47.2 |
| COMP. 17 | 45.4 | 41.2 | 38.0 | 33.6 | 24.8 | 9.3 | 16.3 | 26.0 | 45.4 |

TABLE 4

| | MECHANICAL STRENGTH (MPa) | | | | | MECHANICAL STRENGTH DROP (%) | | | |
|---|---|---|---|---|---|---|---|---|---|
| | 25° C. | 600° C. | 700° C. | 800° C. | 900° C. | 600° C. | 700° C. | 800° C. | 900° C. |
| EX. 1 | 500 | 471 | 440 | 385 | 343 | 5.8 | 12.0 | 23.0 | 31.4 |
| EX. 2 | 520 | 490 | 457 | 399 | 366 | 5.7 | 12.2 | 23.2 | 29.7 |
| EX. 3 | 510 | 481 | 445 | 392 | 354 | 5.6 | 12.8 | 23.1 | 30.6 |
| EX. 4 | 500 | 472 | 436 | 386 | 344 | 5.7 | 12.9 | 22.8 | 31.2 |
| EX. 5 | 520 | 489 | 455 | 402 | 355 | 5.9 | 12.5 | 22.7 | 31.7 |
| EX. 6 | 515 | 486 | 451 | 399 | 349 | 5.7 | 12.4 | 22.5 | 32.2 |
| EX. 7 | 540 | 512 | 487 | 431 | 386 | 5.2 | 9.8 | 20.2 | 28.5 |
| EX. 8 | 550 | 522 | 497 | 439 | 389 | 5.1 | 9.7 | 20.1 | 29.2 |
| EX. 9 | 540 | 512 | 487 | 432 | 383 | 5.2 | 9.8 | 20.0 | 29.1 |
| EX. 10 | 580 | 552 | 527 | 494 | 433 | 4.8 | 9.2 | 14.8 | 25.3 |
| EX. 11 | 590 | 561 | 537 | 503 | 431 | 4.9 | 9.0 | 14.7 | 25.9 |
| EX. 12 | 600 | 571 | 545 | 511 | 443 | 4.8 | 9.1 | 14.8 | 26.2 |
| EX. 13 | 580 | 553 | 527 | 495 | 430 | 4.7 | 9.2 | 14.6 | 25.9 |
| EX. 14 | 570 | 543 | 518 | 487 | 421 | 4.8 | 9.1 | 14.6 | 26.1 |
| EX. 15 | 620 | 592 | 566 | 538 | 507 | 4.5 | 8.7 | 13.2 | 18.2 |
| EX. 16 | 630 | 602 | 576 | 545 | 518 | 4.4 | 8.5 | 13.5 | 17.8 |
| EX. 17 | 640 | 611 | 585 | 555 | 527 | 4.5 | 8.6 | 13.3 | 17.6 |

TABLE 4-continued

| | MECHANICAL STRENGTH (MPa) | | | | MECHANICAL STRENGTH DROP (%) | | | |
|---|---|---|---|---|---|---|---|---|
| | 25° C. | 600° C. | 700° C. | 800° C. | 900° C. | 600° C. | 700° C. | 800° C. | 900° C. |
| EX. 18 | 630 | 602 | 575 | 547 | 521 | 4.4 | 8.7 | 13.2 | 17.3 |
| EX. 19 | 650 | 621 | 593 | 566 | 538 | 4.5 | 8.8 | 13.0 | 17.2 |
| COMP. 1 | 480 | 436 | 411 | 367 | 249 | 9.2 | 14.3 | 23.6 | 48.2 |
| COMP. 2 | 470 | 428 | 401 | 352 | 250 | 8.9 | 14.6 | 25.2 | 46.8 |
| COMP. 3 | 460 | 417 | 389 | 345 | 229 | 9.3 | 15.5 | 24.9 | 50.2 |
| COMP. 4 | 470 | 427 | 393 | 350 | 228 | 9.2 | 16.3 | 25.6 | 51.4 |
| COMP. 5 | 480 | 436 | 408 | 360 | 240 | 9.1 | 14.9 | 24.9 | 49.9 |
| COMP. 6 | 490 | 444 | 411 | 369 | 241 | 9.4 | 16.2 | 24.6 | 50.8 |
| COMP. 7 | 500 | 456 | 425 | 374 | 244 | 8.9 | 15.1 | 25.2 | 51.3 |
| COMP. 8 | 460 | 425 | 389 | 343 | 220 | 7.6 | 15.4 | 25.4 | 52.2 |
| COMP. 9 | 470 | 436 | 395 | 339 | 228 | 7.3 | 15.9 | 27.8 | 51.4 |
| COMP. 10 | 480 | 431 | 413 | 348 | 226 | 10.3 | 13.9 | 27.4 | 52.9 |
| COMP. 11 | 470 | 428 | 398 | 353 | 232 | 8.9 | 15.3 | 24.9 | 50.6 |
| COMP. 12 | 480 | 421 | 402 | 359 | 233 | 12.3 | 16.3 | 25.2 | 51.5 |
| COMP. 13 | 470 | 422 | 395 | 342 | 242 | 10.2 | 16.0 | 27.2 | 48.5 |
| COMP. 14 | 490 | 432 | 418 | 376 | 239 | 11.8 | 14.7 | 23.3 | 51.2 |
| COMP. 15 | 490 | 440 | 420 | 365 | 242 | 10.2 | 14.3 | 25.5 | 50.6 |
| COMP. 16 | 480 | 435 | 410 | 358 | 258 | 9.4 | 14.6 | 25.4 | 46.3 |
| COMP. 17 | 500 | 450 | 425 | 352 | 253 | 10.0 | 15.0 | 29.6 | 49.4 |

As is clear from TABLEs 1 to 4, the alumina-based sintered materials of Examples 1 to 19, which satisfy all the conditions (1) to (3), were found to exhibit high withstand voltage and high mechanical strength at ambient temperature and high temperature, with the withstand voltage characteristics and mechanical strength at high temperature being comparable to those at ambient temperature, as compared with the alumina-based sintered materials of Comparative Examples 1 to 17, which satisfy none of the conditions (1) to (3). In addition, the alumina-based sintered materials of Examples 1 to 19 were found to exhibit a quenching rate and a plastic deformation temperature which were higher than those of the alumina-based sintered materials of Comparative Examples 1 to 17.

The alumina-based sintered materials of Example 7 to 9 satisfy the conditions (1) to (3) and also preferred conditions including the Al component content and area ratio [total area of glass phase/total area of crystal phase]. The alumina-based sintered materials of Example 10 to 14 satisfy the above conditions (Example 7 to 9) and further have an intermediate phase having a thickness of 1 to 10 μm. The alumina-based sintered materials of Example 15 to 19 satisfy the above conditions (Example 7 to 14) and further have a mean grain size and aspect ratio of alumina grains, and a plastic deformation temperature which fall within the aforementioned ranges. Thus, the alumina-based sintered materials of Example 7 to 19 were found to exhibit more improved withstand voltage and mechanical strength at high temperature, and a more reduced drop in these properties at high temperature with respect to those at ambient temperature. Therefore, the alumina-based sintered materials of the Examples were found to attain, at high levels, withstand voltage characteristic and mechanical strength at ambient temperature and high temperature.

2. Production of Spark Plug

By use of the alumina-based sintered materials produced in Examples 1 to 19 and Comparative Examples 1 to 17, spark plugs were fabricated. Specifically, in production of each spark plug, a ground electrode 6 in the form of a wire material (cross-section: 1.6 mm×2.7 mm) was formed from an Ni-base alloy through a conventional method. Separately, a cylindrical inner member 8 made of copper, and a cup-formed outer member 7 made from the Ni-base alloy were prepared. Then, the thus formed inner member 8 was inserted into the outer member 7, and the assembly was subjected to plastic working such as extrusion, whereby a center electrode 2 formed of the inner member 8 and the outer member 7 and having a diameter of 4 mm was produced. Subsequently, a metallic shell 4 was formed into a specific shape with specific dimensions (in particular, a nominal diameter of a screw portion 9 of M10) through plastic working and rolling. Then, one end of the ground electrode 6 was joined, through electric resistance welding, to the end surface of the metallic shell 4. Next, the center electrode 2 is integrated to the insulator 3 formed of the alumina-based sintered material produced in any of Examples 1 to 19 and Comparative Examples 1 to 17, and the insulator 3 was integrated into the metallic shell 4 to which the ground electrode 6 had been joined. Then, the forward end portion of the ground electrode 6 was bent toward the center electrode 2 so that one end of the ground electrode 6 faced the forward end portion of the center electrode 2, whereby the spark plug 1 was produced.

INDUSTRIAL APPLICABILITY

The insulator 3 formed of the alumina-based sintered material exhibits excellent withstand voltage characteristics and mechanical strength, at ambient temperature and high temperature, and the withstand voltage characteristics and mechanical strength are not impaired at high temperature, as compared with those at ambient temperature. Therefore, the spark plug of the present invention employing the insulator 3 is suitably used in a conventional internal combustion engine, as well as in an internal combustion engine of a small scale, of a high-output mode, and of a small-scale and/or a high-output mode. Furthermore, the spark plug of the invention is suitably used in an internal combustion engine employing a fuel containing a highly volatile component.

DESCRIPTION OF REFERENCE NUMERALS

1 spark plug
2 center electrode
3 insulator
4 metallic shell
5 noble metal tip
6 ground electrode 7 outer member
8 inner member
9 screw portion
G spark discharge gap Having described the invention, the following is claimed:

1. A spark plug comprising:
an insulator formed of an alumina-based sintered material, wherein the alumina-based sintered material contains an Al component, an Si component, a Group 2 element component, the Group included in the periodic table defined by Recommendations 1990, IUPAC, and a rare earth element component in such amounts that satisfy a condition (1): 0.25 ≤oxide-reduced amount (mass %) of the Si component ≤1.25, and a condition (2): 1.35 ≤[(oxide-reduced amount of the Si component)/((oxide-reduced amount of the Group 2 element component)/(oxide-reduced amount of the rare earth element component))]≤7.5,
wherein the alumina-based sintered material includes alumina grains, and a glass phase including a crystal phase that satisfies a condition (3) that the crystal phase includes at least one of an aluminate crystal phase and a silicate crystal phase, each having a grain size of 20 to 350 nm.

2. A spark plug according to claim 1, wherein the alumina-based sintered material contains the Al component in an oxide-reduced amount of 97.0 mass % or more, and has an area ratio of the total area of the glass phase to the total area of the crystal phase [(the total area of the glass phase)/(the total area of the crystal phase)] of 1.15 to 1.45.

3. A spark plug according to claim 1, wherein the alumina-based sintered material includes an intermediate phase at an interface between the alumina grains and the glass phase, the intermediate phase having a ratio of the Al component amount to the sum of the Al component amount and the Si component amount of less than 90 mass%, and a ratio of the Si component amount to the sum of the Al component amount and the Si component amount of less than 90 mass%, and a thickness of 1 to 10 μm.

4. A spark plug according to claim 1, wherein the alumina-based sintered material contains alumina grains having a mean grain size of 2.2 to 5.2 μm and a mean aspect ratio of 1.4 to 2.2, and has a plastic deformation temperature of 850 to 1,050° C.

5. A spark plug according to claim 2, wherein the alumina-based sintered material includes an intermediate phase at an interface between the alumina grains and the glass phase, the intermediate phase having a ratio of the Al component amount to the sum of the Al component amount and the Si component amount of less than 90 mass %, and a ratio of the Si component amount to the sum of the Al component amount and the Si component amount of less than 90 mass %, and a thickness of 1 to 10 μm.

6. A spark plug according to claim 2, wherein the alumina-based sintered material contains alumina grains having a mean grain size of 2.2 to 5.2 μm and a mean aspect ratio of 1.4 to 2.2, and has a plastic deformation temperature of 850 to 1,050° C.

7. A spark plug according to claim 3, wherein the alumina-based sintered material contains alumina grains having a mean grain size of 2,2 to 5.2 μm and a mean aspect ratio of 1.4 to 2.2, and has a plastic deformation temperature of 850 to 1,050° C.

* * * * *